April 12, 1966  O. BUTTER ETAL  3,245,294

MEANS FOR AND METHOD OF CUTTING THERMOPLASTIC MATERIALS

Filed Oct. 20, 1964

INVENTORS
BUTTER Otto
SIEWERTH Gerhard
BY FRÖHLICH Helmut
HÄFNER Klaus
ATTORNEY DAMASCHEK Ernst United States Patent Office 3,245,294
Patented Apr. 12, 1966

3,245,294
MEANS FOR AND METHOD OF CUTTING
THERMOPLASTIC MATERIALS
Otto Butter, Neckargemund, Gerhard Siewerth, Wiesloch, Helmut Fröhlich, Kaiserslautern, Pfalz, Klaus Häfner, Mannheim-Gartenstadt, and Ernst Damaschek, Leimen, Germany, assignors to G. M. Pfaff A.G., Kaiserslautern, Pfalz, Germany, a corporation of Germany
Filed Oct. 20, 1964, Ser. No. 405,206
Claims priority, application Germany, Oct. 23, 1963,
P 32,827
11 Claims. (Cl. 83—16)

The present invention relates to a device for and method of thermally cutting or severing thermoplastic materials, or non-thermoplastic materials bonded by a thermoplastic binder, such as sheets, plates, bars, etc., by means of an electrically heated cutter or separating tool.

The term "thermoplastic" material or workpiece as used for the purpose of the following specification and claims is understood to include both integral workpieces of such materials, as well as composite materials consisting of a non-thermoplastic part or elements bonded or joined together by means of a thermoplastic binder, such as laminates or the like aggregate structures.

A drawback in the use of conventionally heated cutting tools or devices of this type is the presence upon the tool surface of impurities or combustion residues adhering thereto after a thermal cutting operation, such residues being liable to smudge or soil, or otherwise deleteriously affect the appearance of the workpieces cut by the same tool or cutter. Attempts have already been made in the past to avoid this drawback by mechanically cleaning the cutting tool after each cutting operation, such as by subjecting it to a brush treatment, to remove the impurities or combustion residues prior to the cutting of a subsequent workpiece by the tool. While it is possible in this manner to avoid soiled areas or spots upon the workpieces in the neighborhood of the cut, there is required thereby aside from other drawbacks, a separate operating step which greatly reduces the efficiency or operating speed of the cutting devices.

It has furthermore become known, in the attempt to overcome the afore-mentioned defect, to utilize impulse-heated tools for the cutting of thermoplastic workpieces, or workpieces of non-thermoplastic material bonded by a thermoplastic binder. While by the use of such cutting or heating techniques, the material or combustion residues adhering to the surface of the cutting tool may be substantially burned or volatilized as a result of the high instantaneous operating temperature being in excess of the melting point of the material, molecular and other surface changes have been observed at or near the separated areas as a result of the excessive instantaneous heating temperature during the cutting operation, whereby to result in staining or discoloring of the material to a brownish or the like tint. This, in turn, unduly increases the number of rejects or defective units or workpieces.

Accordingly, an important object of the present invention is the provision of an improved thermal cutting tool for the severing of thermoplastic materials or workpieces and a novel method of cutting such materials, whereby the above-mentioned and related drawbacks and difficulties are substantially overcome or minimized.

A more specific object of the invention is provision of an improved cutting tool of the referred to type and a method of cutting thermoplastic materials by which discoloring of soiled spots or areas due to combustion residues caused by excess operating temperatures are substantially avoided or reduced to a permissible minimum.

The invention, both as to the foregoing and ancillary objects as novel aspects thereof, will be better understood from the following detailed description, taken in conjunction with the accompanying drawing forming part of this specification and in which.

Figure 1:
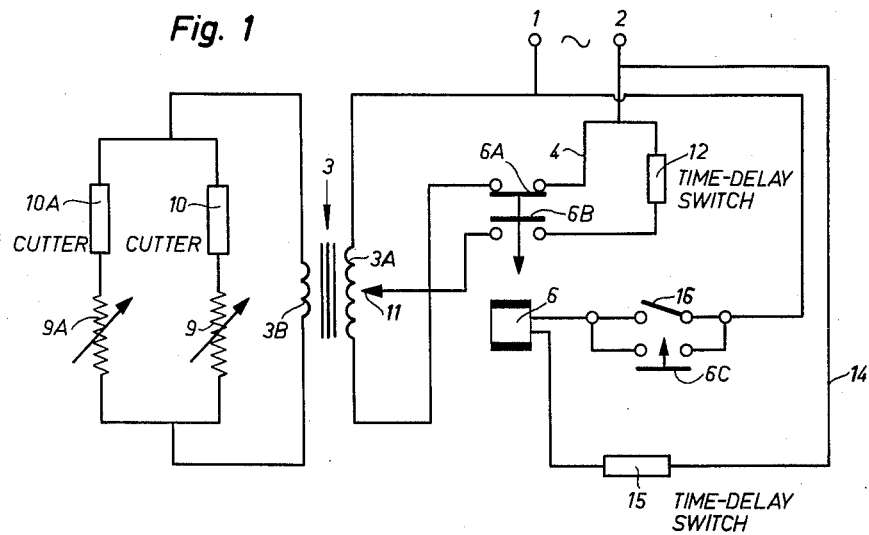
FIG. 1 is an electrical circuit diagram of a cutting device designed for the carrying into effect of the invention, the circuit shown corresponding to the normal or operating condition of the device.

With the foregoing objects in view, the invention involves essentially the provision of a thermal cutting device of the referred to type constructed and operated in such a manner as to be heated, while in contact with the material to be cut, or during the cutting operation proper, to a first temperature within the softening range, or range of plasticity, of the material being cut, on the one hand, and to be heated temporarily upon disengagement from the material, or completion of the cutting operation, to a second temperature above or in excess of the de-composition temperature of the thermoplastic material, on the other hand.

As a result of the step-like heating of the cutting tool and in view of the fact that the tool during its contact with the material is heated to a temperature not exceeding the softening point of the material, both the combustion residues adhering to the surface of the tool and liable to cause soiling of the next workpiece to be cut, as well as the discoloring effects encountered with simple impulse-heated tools are substantially avoided or eliminated by the use of the invention, due to the fact that the combustion residues are completely burned or volatilized by the instantaneous or impulse heat upon the material being disengaged from the tool, and that molecular changes and discoloring are substantially prevented as a result of the short or instantaneous application of the peak temperature, or temperature in excess of the de-composition temperature of the material.

According to a thermally especially favorable technique in carrying into effect the invention, the lower operating temperature, for effecting the cutting operation proper, of the cutting tool may be achieved by directly heating the cutting tool or member constructed of a material of adequate electrical resistivity, by a suitable power source, whereupon that is, after the cutter has been disengaged from the material, a temporary thermal impulse is applied to or superimposed upon the continuous or cutting temperature, to temporarily raise the temperature of the tool to a point above the de-composition temperature of the material. In order to enable cooling or return the tool to the lower (cutting) temperature for the starting of a new cutting operation, both current components, that is, the current producing the cutting temperature, on the other hand, may be interrupted briefly, in the manner described presently.

Whereas in the cutting of single or multi-layer materials, the separation by the heated cutting tool may be due to or predicated on the melting of the material at the cutting area, materials of greater thickness may be cut by the utilization of a combined welding and cutting technique, these and other details being well known and more or less immaterial as far as the present invention is concerned.

The cutting device for the carrying into effect of the invention is advantageously designed to function both as a separating and cutting tool, that is for effecting cutting both by heat and pressure, the tool being mounted for this purpose upon a pair of insulating supporting arms. The latter, in order to prevent distortion or deformation of the cutting edge as a result of thermal expansion, may be in turn supported by or fitted with suitable yielding or resilient mounting means. The same effect may be achieved in a most simple manner by the provision of restricted portions in said arms, or by the mounting of said arms at a suitable angle to the cutter, in such a manner as to provide an adequate resiliency, or to enable ready expansion and contraction of the cutter under the various heat operating cycles to which the tool is subjected during use. In order to prevent lateral distortion or bending of the cutting edge, the latter advantageously has a wedge-shaped cross-section, these and other details of construction and operation becoming more apparent as the detailed description proceeds in reference to the drawing.

Referring more particularly to FIG. 1, there is shown, by way of example, a wiring diagram for a thermal cutter constructed and operated in accordance with the invention. The ends of the primary winding 3A of a step-down heating transformer 3 are connected to the terminals 1, 2 of an alternating current source, such as a power circuit or network. The lead 4 connecting the power terminal 2 with the transformer 3 includes the normally closed contact 6A of a relay 6. The secondary winding 3B of the transformer 3 having a number of winding turns less than the number of turns of the primary winding 3A is connected to the resistance 10 representing the thermal cutter (see FIGS. 2–4) in series with a variable or control resistor 9. If desirable, any number of additional cutting devices 10A and series resistors 9A may be connected in parallel to the winding 3B for the energization of a corresponding number of cutters by the same power source. While a separate control resistor 9 and 9A may be provided for each cutter, as shown in the drawing, a single resistor in series-parallel connection may serve for the control of a plurality of cutters, as will be understood.

The primary winding 3A of the transformer 3 has a tap 11 which is connected, by way of a further normally open contact 6B of the relay 6 and in series with a normally closed time-delay switch or relay 12, to the lead 4 or power supply terminal 2, in the example shown. The junction point between the lead 4 and the circuit leading to the tap 11, coinciding with the terminal 2 in the example shown, is connected, through a lead 14 and a further time-delay relay or switch 15, to one pole of the relay 6 whose remaining pole is in turn connected, through a switch 16 to the remaining power terminal 1, said switch being shunted by a third or holding contact 6C of the relay 6, whereby to provide the energizing current for the relay 6 being controlled by the switches 15 and 16 in the manner further described in the following.

Figure 2:
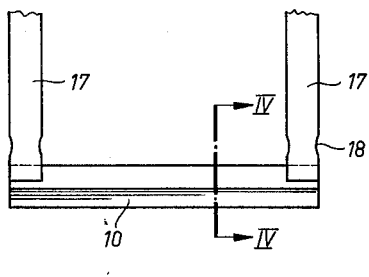
FIG. 2 is an elevation of a thermal cutting tool suitable for use in connection with FIG. 1.
Figure 3:
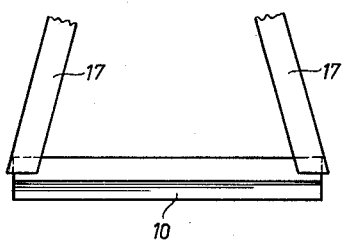
FIG. 3 illustrates a modification of the tool shown by FIG. 2.
Figure 4:
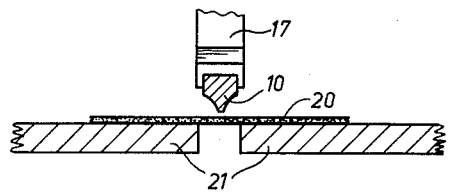
FIG. 4 is a sectional view taken on line IV—IV of FIG. 2 and including a thermoplastic workpiece shown in the position prior to cutting.

The cutting tool 10, FIGS. 2–4, consisting of metal or alloy of high electrical resistivity, is secured to a pair of supporting arms 17 consisting of electrically non-conducting material, such as porcelain or ceramic, said arms being in turn affixed to a handle (not shown), for instance in the manner of a known printing stamp, to enable use of the device in a manner well known and understood. In order to prevent thermal distortion or deformation of the tool, the supporting arms 17 are provided with means to provide a sufficient resiliency, such as by the provision of restricted portions or recesses 18, in the arms 17, FIG. 2, or by obliquely mounting the arms at an angle to the tool or cutter 10, as shown in FIG. 3. Alternatively, any suitable yielding mounting or connecting means may be utilized to enable ready expansion and contraction of the tool, to prevent bending or distortion of the cutting edge.

The operation of the tool shown for the carrying into effect of the invention will now be described in the following.

With the circuit being in the normal condition as shown by the drawing, let it be assumed that a workpiece 20, FIG. 4, to be cut (plate, bar, etc.) has been properly positioned upon the base or support 20 of the device and that the terminals 1, 2 are connected to the power source or network. As a consequence, a current flow will be established from the source 1, 2 through the lead 4, the closed contact 6A of the relay 6 and the entire primary winding 3A of the transformer 3, whereby the secondary winding 3B of the transformer supplies a voltage reduced in accordance with the step-down ratio of the transformer. The cutter 10 is thus energized by way of the resistor 9 which is adjusted in such a manner as to raise the cutting temperature to a point within the softening range of the thermoplastic material to be cut, whereby to enable thermal cutting of the workpiece with or without additional pressure being applied during the cutting operation. After the cutter 10, at the end of a cutting operation, is disengaged from the material or workpiece 20, or the latter has been separated completely, switch 16 is briefly depressed to close the energizing circuit of the relay 6, the latter being maintained in the closed position by the holding contact 6C shunting the switch 16. In other words, the switch may be depressed and released instantly without re-opening the relay circuit.

Closing of the relay 6, in turn, causes energization of both the time-delay switches 12 and 15, as well as opening of contact 6A and closing of relay contact 6B. As a consequence, lead 4 to the transformer is interrupted and the tap 11 of the transformer connected to the power source 1, 2 by way of the relay 12 and relay contact 6B. A temporary thermal impulse is thus applied to the cutter 10, to temporarily raise its temperature to a point above the decomposition temperature of the thermoplastic material, due to the reduction of the transformer step-down ratio by the tap 11. As a consequence, any combustion residues adhering to the tool surface will be instantly burned or volatilized, whereby to provide a clean tool for the cutting of the next workpiece.

The time-delay switch or relay 12, which has a delay time less than the delay time of the relay 15, opens after a predetermined interval, determining the temporary excess heating period, thus interrupting the circuit leading to the tap 11 and completely de-energizing the transformer 3 with both supply leads through relay contacts 6A and 6B being interrupted. As a result, the cutter 10 is allowed to cool, whereupon opening of the relay 15, having a greater delay time than relay 12, will result in the de-energization of the relay 6, release of contact 6B and reclosing of contact 6A. At the same time, the holding contact 6C of switch 16 is released, whereby to return the circuit to its initial or normal operating condition with the entire primary winding connected to power source 1, 2, to reheat the cutter to its normal operating temperature for the commencement of a new cutting operation. In other words, the device, upon adequate cooling of the tool 10, is automatically restored to a condition for renewed use without involving the defect and drawbacks mentioned hereinabove.

The time delays of the delayed-action switches or relays 12 and 15 are so adjusted or related as to adapt the device to varying cooling periods, or periods between the de-energization of relay 12 and the de-energization of relay 15 for the restoration of the normal operation condition in the manner described. Adjustment of the resistor 9 enables the normal cutting temperature to be adapted to different types of material to be cut. The relays 12 and 15 may be in the form of delayed-action switches, such as bi-metallic elements heated by the current and interrupting the circuit after a predetermined heating time. However, any other delayed-action device or switch known may be used for the purpose of the invention.

While in the example shown the intermittent control of the temperature of the thermal cutter has been illustrated by varying the step-down ratio of the heating transformer, other equivalent means or methods of effecting a temporary temperature rise and subsequent cooling of the tool may be resorted to for the purpose of the invention, as will suggest themselves to those skilled in the art.

In the foregoing the invention has been described in reference to a specific illustrative device. It will be evident, however, that variations and modifications, as well as the substitution of equivalent parts or elements for those shown herein for illustration may be made without departing from the broader purview and spirit of the invention as set forth in the appended claims. The specification and drawing are accordingly to be regarded in an illustrative rather than in a restrictive sense.

We claim:

1. A device for cutting thermoplastic workpieces comprising in combination:
   (1) a thermal cutter of high electrical resistivity,
   (2) current supply means energizing said cutter, to raise the same to an operating temperature within the softening range of the thermoplastic material to be cut,
   (3) current control means effective upon actuation to raise said operating temperature to a point in excess of the decomposition temperature of said material,
   (4) first time-delay control means responsive to the actuation of said current control means and effective, after lapse of a predetermined time interval, to disconnect said current supply means from and to allow of cooling of said cutter, and
   (5) second time-delay control means also responsive to the actuation of said control means and having a greater delay time than said first time-delay means, to release said current control means, and to reconnect said current supply means to said cutter.

2. In a thermal cutting device as claimed in claim 1, said current supply means being comprised of a step-down transformer having a primary winding connected to an alternating current power source and having a secondary winding connected to said cutter, and said current control means consisting of means to connect different numbers of winding turns of said primary winding to said source.

3. In a thermal cutting device as claimed in claim 2, including a variable resistance in series with said cutter and said secondary winding.

4. In a thermal cutting device as claimed in claim 1, said current supply means including a step-down transformer having a primary winding connected to an alternating current power source and a secondary winding connected to said cutter, to provide a main heating circuit for said cutter, to raise its temperature to the softening point of the thermoplastic material, a relay having an energizing circuit and a first normally closed contact inserted in said main heating circuit, a second normally open contact of said relay connected between a tap of said primary winding and the terminal of said source adjoining said first contact, to provide an auxiliary heating circuit for said cutter, to raise its temperature to a point above the decomposition temperature of said material, a first time-delay switch, inserted in said auxiliary heating circuit, and a second time-delay switch inserted in said relay energizing circuit, said second time-delay switch having a delay time in excess of the delay-time of said first time-delay switch, whereby energization of said relay results in the successive operations of opening of said main heating circuit, temporary closing of said auxiliary heating circuit during a time interval determined by the delay time of said first time-delay switch, disconnection of the power supply from and cooling of said cutter during the interval between the instants of de-energization of said first and second time-delay switches, and re-closing of said primary heating circuit upon de-energization of said relay by said second time-delay switch.

5. In a thermal cutting device as claimed in claim 4, including a control switch in said relay energizing circuit, and a third normally open contact of said control relay shunted across said control switch.

6. A device for cutting thermoplastic workpieces comprising in combination:
   (1) a thermal cutter of high electrical resistivity,
   (2) a normally closed main heating circuit to raise said cutter to a temperature at a point within the softening range of the thermoplastic material to be cut,
   (3) an auxiliary heating circuit to raise the cutter temperature to a point in excess of the decomposition temperature of said material,
   (4) common control means to open said main heating circuit and to close said auxiliary heating circuit, and
   (5) first and second time-delay control means having different delay times and operably associated with said first control means and said auxiliary circuit, respectively, to successively intermittently heat said cutter to said decomposition temperature, to open both said heating circuits, and to finally reclose said main heating circuit upon actuation of said control means.

7. In a cutting device as claimed in claim 6, said cutter having a wedge-shaped cross-section.

8. In a cutting device as claimed in claim 6, including a pair of non-conducting supporting arms, and means to resiliently support the ends of said cutter by said arms.

9. In a cutting device as claimed in claim 8, said arms provided with recessed portions adjacent to said cutter, to yieldingly support said cutter by said arms.

10. A method of cutting thermoplastic materials by means of a heated cutting tool comprising the steps of:
    (1) heating said tool to a first temperature within the softening range of the material to be cut,
    (2) cutting the material by said tool maintained at said first temperature,
    (3) temporarily raising, after cutting of the material, said tool to a second temperature in excess of the decomposition temperature of said material, and
    (4) cooling and re-heating the tool to said first temperature prior to the starting of a new cutting operation.

11. A method of cutting thermoplastic materials by means of an electrically heated cutting tool comprising the steps of:
    (1) applying a normal heating current to said tool, to raise its temperature to a first point within the softening range of the material to be cut,
    (2) cutting the material,
    (3) temporarily increasing, after completion of the cutting operation, the heating current, to raise the tool temperature to a point in excess of the decomposition temperature of said material, and
    (4) interrupting the current supply during a predetermined cooling period and re-applying said normal heating current prior to the starting of a new cutting operation.

References Cited by the Examiner

UNITED STATES PATENTS 1,810,987   6/1931   Schmitt _____ 83—171

WILLIAM W. DYER, JR., *Primary Examiner.*

F. T. YOST, *Assistant Examiner.*